United States Patent [19]

Utner et al.

[11] Patent Number: 5,045,965
[45] Date of Patent: Sep. 3, 1991

[54] ELECTRICAL CAPACITOR

[75] Inventors: Ferdinand Utner, Regensburg; Udo Hieber, Heidenheim-Schnaith, both of Fed. Rep. of Germany

[73] Assignee: Siemens Aktiengesellschaft, Munich, Fed. Rep. of Germany

[21] Appl. No.: 442,700

[22] Filed: Nov. 29, 1989

[30] Foreign Application Priority Data

Dec. 14, 1988 [EP] European Pat. Off. ........ 88120854.0

[51] Int. Cl.$^5$ .................... H01G 1/11; H01G 9/10
[52] U.S. Cl. ................................. 361/275; 361/519
[58] Field of Search .............. 361/272, 275, 519, 537; 219/60, 61, 64, 73.2, 121.82, 121.36, 130.21, 130.01

[56] References Cited

U.S. PATENT DOCUMENTS

| 3,050,843 | 8/1962 | Margolis et al. | 29/25.42 X |
| 3,304,473 | 2/1967 | Netherwood et al. | 361/275 X |
| 4,106,068 | 8/1978 | Flanagan | 361/15 |
| 4,213,025 | 7/1980 | Kuhnen | 219/73.2 |
| 4,296,453 | 10/1981 | Aigle et al. | 361/275 |

FOREIGN PATENT DOCUMENTS

| 0093455 | 11/1983 | European Pat. Off. . |
| 507554 | 2/1929 | Fed. Rep. of Germany . |
| 891279 | 9/1953 | Fed. Rep. of Germany . |
| 2802935 | 8/1978 | Fed. Rep. of Germany . |
| 2825377 | 12/1979 | Fed. Rep. of Germany . |
| 1143821 | 10/1957 | France . |

Primary Examiner—Donald A. Griffin
Attorney, Agent, or Firm—Hill, Van Santen, Steadman & Simpson

[57] ABSTRACT

A capacitor winding is integrated in a metallic housing that is closed in a moisture-tight and gas-tight manner by a cover. Spaced bushings are connected to and extend through the cover. The cover has the shape of a spherical cap with an outwardly directed arch.

7 Claims, 1 Drawing Sheet

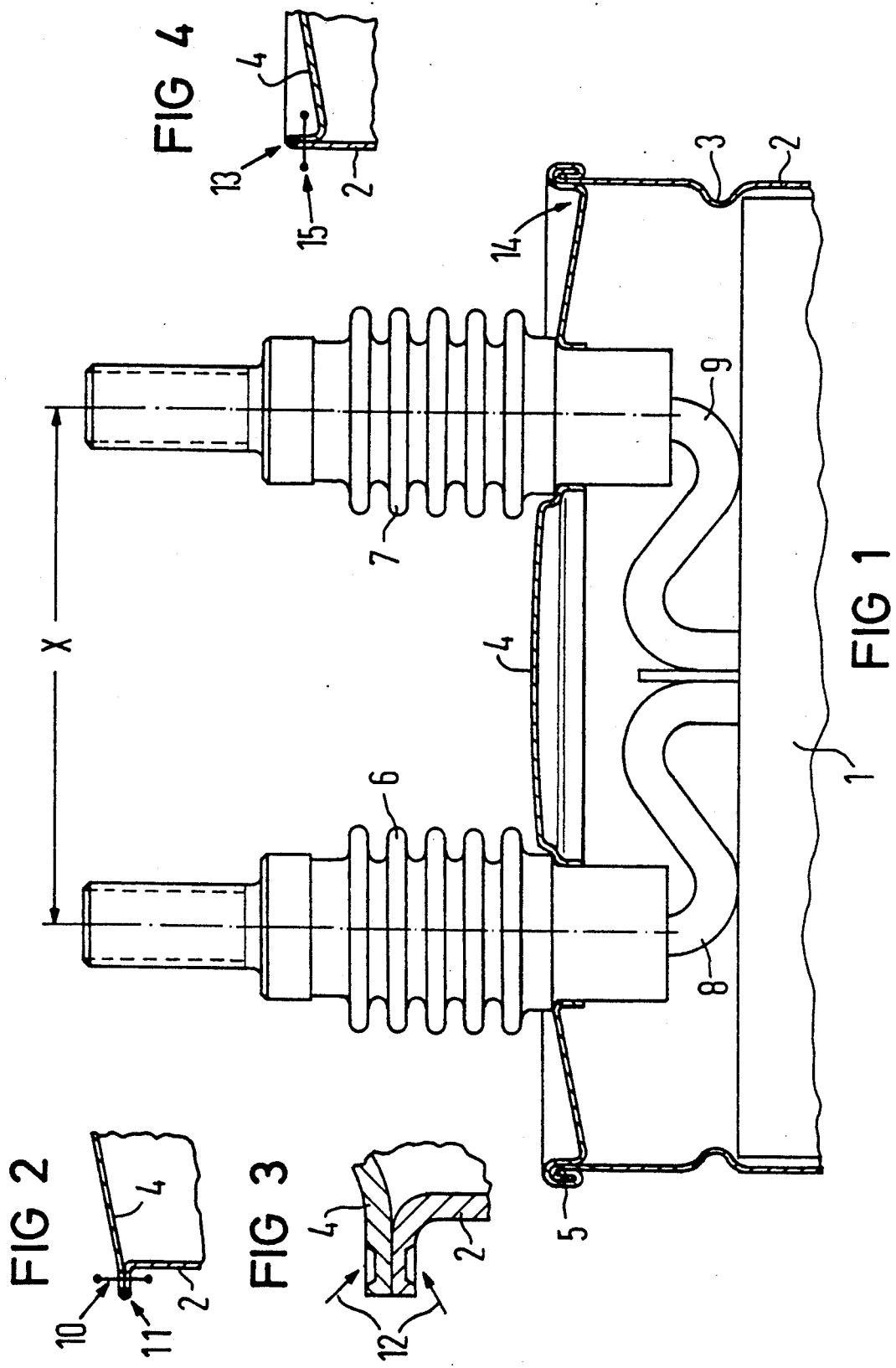

ELECTRICAL CAPACITOR

BACKGROUND OF THE INVENTION

1. Field of the Invention

The present invention relates to an electrical capacitor, particularly a power capacitor, that is integrated in a metallic housing closed by a moisture tight and gas-tight cover in which at least one electrically-insulating bushing for the capacitor terminals is arranged in the cover.

2. Description of the Prior Art

German application 28 25 377 C2 discloses a capacitor of the type generally set forth above.

An over-pressure can arise in the housing of such a capacitor given an excessively-high heat development in the capacitor winding or, respectively, given the creation of gaseous decomposition products due to self-curing processes in oil-impregnated capacitors. So that this over-pressure does not become excessively great (housing damage, explosion risk), these capacitors have over-pressure break-away fuses that, for example, are composed of rated break locations having cross-sectional diminution arranged in wires or, respectively, leads. Given a deformation of the floor occurring due to elevated internal pressure, the current conductors are torn away via a floor anchoring and, therefore, the power supply is interrupted.

Due to the folded connection between the cover and the housing, the cover, together with the bushings soldered thereinto, must be fabricated of about the same material thickness as the housing. Added thereto is that a non-magnetic, solderable material (for example brass, tinned) that has less strength than steel must be employed because of the bushings (ceramic insulators) to be soldered in as well as because of the alternating fields effective in this region. Due to these restrictions in the thickness of the material and in the type of material, a pronounced deformation of the cover occurs before the shut-off pressure is reached. Since, however, the distance between the bushings changes to an inadmissibly great degree simultaneously with the cover deformation given, for example, two bushings or, respectively, a bushing which can place itself at an angle given only one bushing, the cover must be significantly reinforced.

Ribs in a great variety of shapes, sizes and arrangements have therefore been impressed in the cover for stiffening purposes. The reduction in deformations thereby achieved were nonetheless unsatisfactory or, respectively, inadequate.

SUMMARY OF THE INVENTION

It is therefore an object of the invention to provide an improved capacitor of the type generally set forth above such that the bushing spacing or, respectively, the excursion given only one bushing is not changed by more than 10% even given an increase in pressure in the capacitor housing.

The above object is achieved, according to the present invention, in an electrical capacitor, particularly a power capacitor which is integrated in a metallic housing which has a cover that has the shape of a spherical top with an outwardly-directed curvature.

Advantageously, cover and housing are connected to one another or, respectively, welded to one another with a fold.

BRIEF DESCRIPTION OF THE DRAWINGS

Other objects, features and advantages of the invention, its organization, construction and operation, will be best understood from the following detailed description, taken in conjunction with the accompanying drawing, on which:

FIG. 1 is a fragmentary sectional view of a capacitor housing having a cover and a pair of spaced-apart insulating bushings extending through the cover;

FIG. 2 is a fragmentary sectional view of a type of connection between the cover and the housing;

FIG. 3 is a fragmentary sectional view of another type of connection the cover and the housing; and FIG. 4 is a fragmentary sectional view of still another type of connection between the cover and the housing.

DESCRIPTION OF THE PREFERRED EMBODIMENTS

FIG. 1 illustrates a capacitor including a capacitor winding 1 that is integrated in a metallic housing 2. The winding 1 is fixed in the housing 2 with, for example, a bead 3. The housing 2 is closed in a moisture-tight and gas-tight manner by a cover 4.

The cover 4 has the shape of a spherical cap having an outwardly-directed arch. The housing 2 and the cover 4 are connected to one another with a folded connection 5.

A pair of bushings 6 and 7 are arranged in the cover 4, the bushing 6 and 7 being composed of ceramic or plastic insulator members that are soldered or tightly glued in or are riveted in. A pair of leads 8 and 9 for the capacitor winding 1 are arranged in the interior of the housing 2.

The insulating bushings 6 and 7 are spaced a distance X from one another.

A housing having a diameter of 176mm was closed with a brass cover (thickness 0.7-0.8 mm). The spacing x of the leads 6 and 7 amounted to 100 mm.

During testing under pressure, the bushing spacing X in a folded embodiment increased by one about 7% at 2 bar and by only about 10% at 3 bar.

For comparison, a capacitor housing of the same size was closed with a standard, flat cover. Given an interior increase in pressure of 2 bar, the bushing spacing x changed by 25% given covers that were reinforced with parallel ribs or, respectively, increased by 20% given rib reinforcement arranged in a star pattern.

Given an increase of the shut-off pressure to about 3 bar, the bushing spacing X changed to values of 38% (parallel ribs) or, respectively, 30% (ribs arranged in a star pattern or, respectively, radially).

Even given drawn-in or, respectively, welded-in (solid) steel sheets 2-3 mm thick, the required, maximum change in spacing of 10% was far from being reached; on the contrary, the bushing spacing changed by 18% and, respectively, 26%.

It may be seen from the exemplary embodiments that a far, far lower change of the bushing spacing X is surprisingly achieved by a crown-shaped cover 4, in accordance with the present invention, even without rib reinforcement. A further improvement, i.e. reduction of the spacing x, can thereby be achieved when the brass cover tested in the exemplary embodiment is replaced by a non-magnetic stainless steel cover (partially tinned in the solder region of the ceramic bushings).

FIG. 2 illustrates that a cover 4 and a housing 2 are connected to one another by a seam weld at the location 10 and by a protective atmosphere or, respectively, plasma weld at the location 11.

FIG. 3 illustrates an embodiment wherein the cover 4 and the housing 2 are connected to one another with a cold pressure welding 12 or protective atmosphere welding.

In FIG. 4, the housing 2 and the cover 4 having a raised edge are connected to one another at a location 13 by a protective atmosphere or plasma welding. The protective atmosphere welding, for example, can be executed as a tungsten inert gas (WIG) welding.

A combined protective atmosphere weld 13 and a seam weld 14 is also possible and advantageous since the flange is thereby largely prevented from hinging up under a pressure load.

The most favorable shapes thereby derive for covers 4 joined to the housing 2 with a seam weld (FIG. 2) or by cold pressure welding (FIG. 3), whereby, of course, the shapes can also be joined with other welding processes (for example, WIG, plasma or laser welding, etc) either individually or in combination with the seam welding or cold pressure welding.

Given the connection shown in FIG. 1 on the basis of the fold 5, the necessary, annular recess for the bell (part of the folding tool) must likewise be crowned in this region since this region otherwise disproportionately contributes to the deformation of the cover 4 under pressure.

Other materials, such as aluminum or copper-clad aluminum stock (Al-Cu), can also be employed for the cover 4 in addition to the materials brass and steel set forth in the exemplary embodiments.

The subject matter of the present invention is suitable for all capacitors integrated in a housing wherein only a slight change in the housing spacing dare occur given a pressure rise in the housing, as required, for example, given installations under tight space conditions.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. An electrical capacitor comprising:
a metallic housing;
a stiff metallic cover connected to enclosing said housing in a moisture-tight and gas-tight seal; and
at least one pair of spaced insulating bushings connected to and extending through said cover to define a lead-through spacing,
said cover comprising the shape of a spherical cap having an outwardly-directly arch and being sufficiently stiff so as to prevent the cover from bellying out and thus enlarging the lead-through spacing.

2. The electrical capacitor of claim 1, wherein:
said housing includes a folded-back peripheral edge;
said cover includes a peripheral fold about and embracing said peripheral edge of said housing.

3. The electrical capacitor of claim 2, wherein:
said folds of said cover and said housing are welded to one another.

4. The electrical capacitor of claim 1, wherein:
said housing includes an outwardly-directed peripheral flange; and
said cover comprises a peripheral edge parallel to and in intimate contact with said flange; and
a peripheral cold pressure weld joining said peripheral edge of said cover and said flange.

5. The electrical capacitor of claim 1, wherein:
said housing includes an outwardly-directed peripheral flange;
said cover includes an outwardly-directed peripheral flange parallel to and in engagement with said flange of said housing;
a peripheral seam weld joins said flanges; and
a further weld joins the edges of said flanges.

6. The electrical capacitor of claim 5, wherein:
said further weld is a protective atmosphere weld.

7. The electrical capacitor of claim 6, wherein:
said further weld is a plasma weld.

* * * * *